(12) United States Patent
Warnaka et al.

(10) Patent No.: US 6,356,641 B1
(45) Date of Patent: Mar. 12, 2002

(54) VEHICULAR LOUDSPEAKER SYSTEM

(75) Inventors: Glenn E. Warnaka, State College; Mark E. Warnaka, Howard, both of PA (US); Michael J. Parrella, Weston, CT (US)

(73) Assignee: New Transducers Limited, London (GB)

( * ) Notice: Subject to any disclaimer, the term of this patent is extended or adjusted under 35 U.S.C. 154(b) by 0 days.

(21) Appl. No.: 08/720,163

(22) Filed: Sep. 25, 1996

(51) Int. Cl.[7] ................................................ H04R 25/00
(52) U.S. Cl. ............................ 381/190; 381/191; 381/86
(58) Field of Search ........................... 381/86, 205, 203, 381/188, 190, 302, 87, 332, 386, 389, 152, 191, 173, 171, 116

(56) References Cited

U.S. PATENT DOCUMENTS

| | | | |
|---|---|---|---|
| 4,514,599 A | * 4/1985 | Yanagishima et al. | 381/203 |
| 4,597,470 A | * 7/1986 | Takagi et al. | 381/86 |
| 5,606,623 A | * 2/1997 | Bahm, III et al. | 381/86 |
| 5,699,438 A | * 12/1997 | Smith et al. | 381/86 |
| 5,838,805 A | 11/1998 | Warnaka et al. | 381/190 |
| 6,195,440 B1 | 2/2001 | Warnaka et al. | 381/190 |

FOREIGN PATENT DOCUMENTS

JP 4-97700 * 3/1992

\* cited by examiner

*Primary Examiner*—Minsun Oh Harvey
(74) *Attorney, Agent, or Firm*—Foley & Lardner

(57) ABSTRACT

An improved loudspeaker system for a passenger vehicle such as an automobile is disclosed. The system comprises a transducer capable of being excited by applied electric potential and electronic means that is electrically connected to the transducer to apply electric potential thereto. It is a feature of the present invention that the diaphragm driven by the excited transducer is comprised of the headliner of the vehicle.

4 Claims, 10 Drawing Sheets

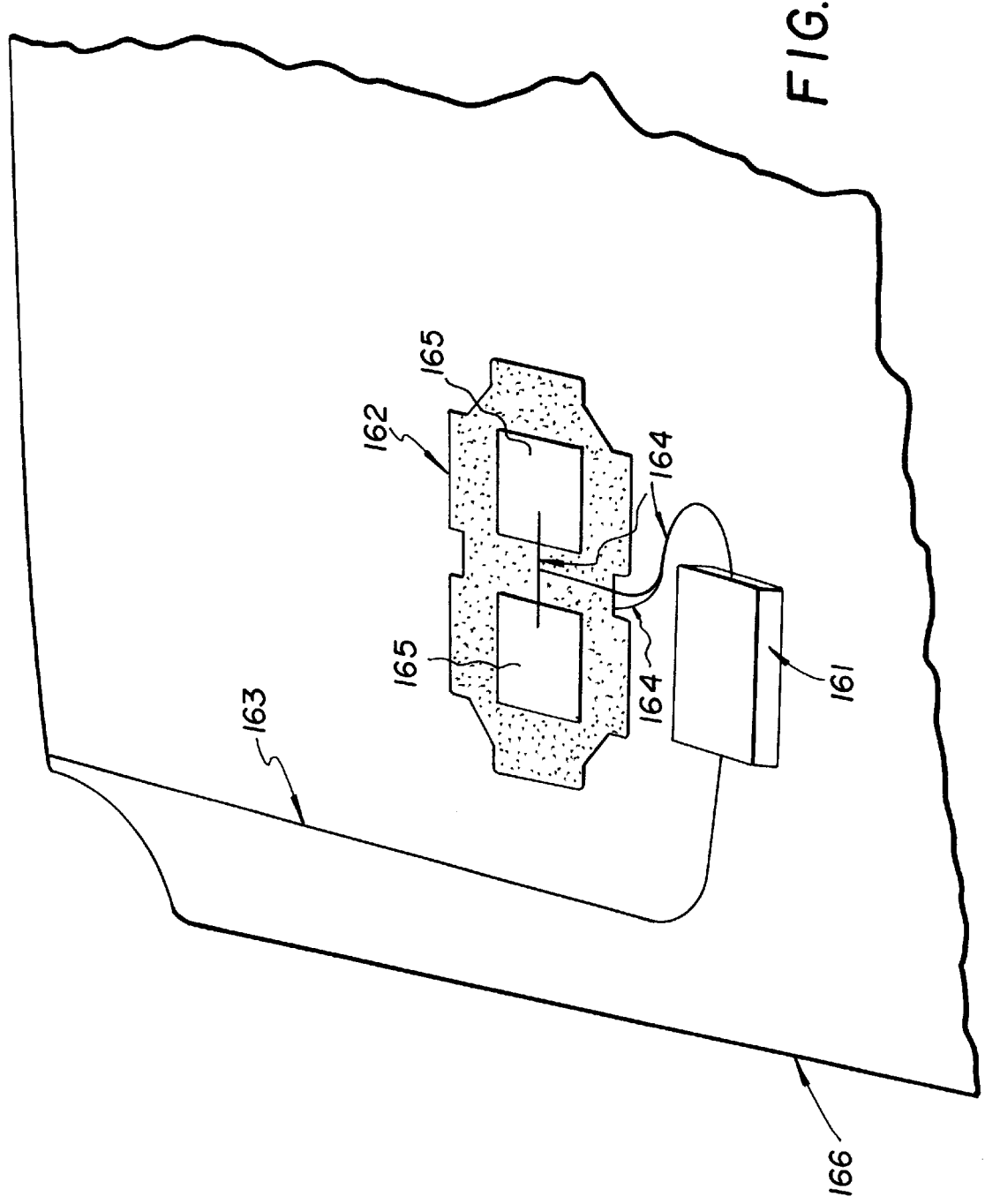

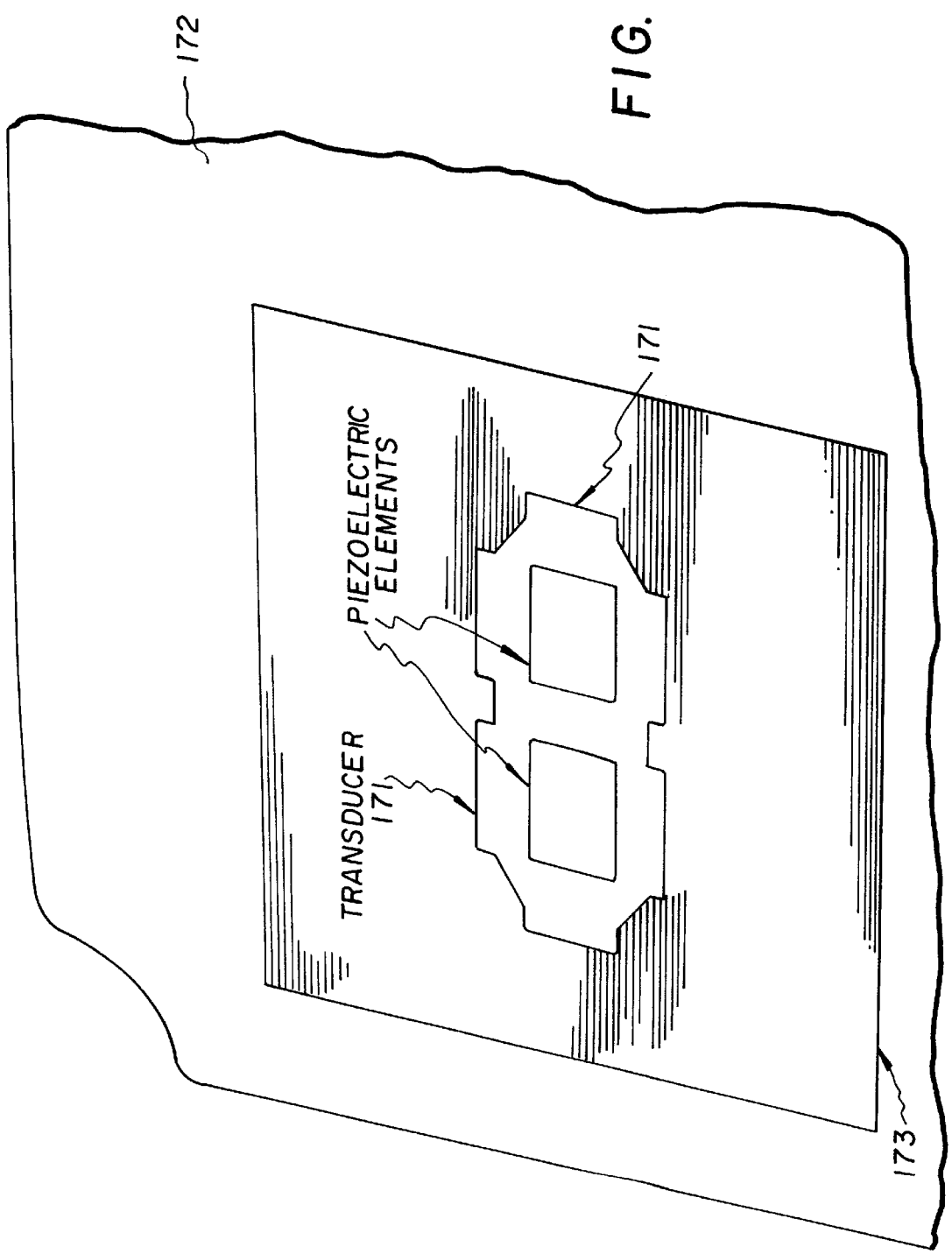

VEHICULAR LOUDSPEAKER SYSTEM

This invention relates to a novel speaker system for a vehicle such as an automobile, truck, boat, aircraft, etc.

BACKGROUND OF THE INVENTION

At present, speakers for a car stereo usually consist of at least two loudspeakers mounted in or under the instrument panel or in the front doors. The loudspeakers are mounted on the left and right sides of the car in order to produce a stereo image. In larger vehicles, loudspeakers may also be mounted in the rear doors to provide a more even sound throughout the car and to improve the stereo image at the rear seat. Loudspeakers may also be mounted on the rear shelf to further enhance the sound. Often the rear mounted speakers are woofers or sub-woofers to increase the bass frequencies. Such systems produce a less than ideal sound in a car, in that they provide for distinctively localized sources of sound and, further, do not meet a desired objective of providing sound which seems, to the listener, to fill the vehicle. Various methods have been utilized to meet this objective, which methods typically involve adding additional speaker(s) to the door panels or other locations. In fact, high cost multiple speaker systems may employ twenty to thirty speakers or more in an attempt to further improve the sound inside the car; but, aside from increasing the costs, they do not satisfactorily achieve the desired objective and in fact provide varying performance based on one's position within the car's interior. Such additional speakers are typically not located adjacent to the heads of the passengers. Further, the speakers, being located in door panels, dashboards and other accessible areas, are susceptible to malfinction and breakage, such as a result of contact with water and other fluids. With particular regard to speakers located in door panels, while they were, prior to the present invention, believed to be a necessity for satisfactory sound reproduction in a vehicle, they are looked upon with disfavor by the automobile industry, since they require the door to have a greater thickness and, therefore, more weight than a door in which speakers would not be incorporated. There are also perceived to be design deficiencies inherent when speakers are incorporated in a dash. In both the door and the dash, the speakers are not easily installed and require extensive engineering to provide brackets to hold the speakers and added fixtures and tooling for the doors. Removing conventional speakers from doors and dashes and placing them, for example, in the roof area of a vehicle would not be successful, since, because of their weight and bulk they would constitute a safety hazard, in the event of an accident, if placed overhead.

It is an object, therefore, of this invention to provide a speaker system which has excellent acoustical properties for the occupants of the vehicle, and which, because of its location, is more durable and less susceptible to damage and breakage than existing speaker constructions, and which is removed from the door and other troublesome areas of a vehicle. It is also an object of this invention to provide a speaker system that is located closer to the ears of the passengers to remove many of the difficulties passengers may have hearing the speaker output with clarity when the speakers are located in other parts of the car far from the passenger's ears.

These and other features, objects and advantages of the present invention will become apparent upon reading the following description thereof together with reference to the accompanying drawings.

SUMMARY OF THE INVENTION

According to the present invention, the headliner of a vehicle, in addition to its standard decorative features, functions, when combined with other elements, as the diaphragm of a vehicle's speaker system. In particular, the loudspeaker system of the present invention comprises a transducer capable of being excited by applied electric potential and a diaphragm that is driven by the excited transducer, with the diaphragm being comprised of the headliner of the vehicle. In addition, the loudspeaker system contains electronic means electrically connected to the transducer to apply electric potential to it. According to the present invention, an occupant in a vehicle will experience a system in which the sound is reproduced close to his or her head in a manner which seems to fill the vehicle's interior with sound. With the entire headliner functioning as a diaphragm, the reproduced sound does not appear to come from a localized area but instead appears to fill the entire interior of the vehicle, and, hence, the stereo image and sense of spaciousness of the sound is greatly improved.

DESCRIPTION OF THE INVENTION

FIG. 16 illustrates a transducer of the present invention utilized in close combination with an amplifier.

FIG. 17 illustrates a method for installing a transducer on a headliner.

DETAILED DESCRIPTION OF THE INVENTION

Figure 1:
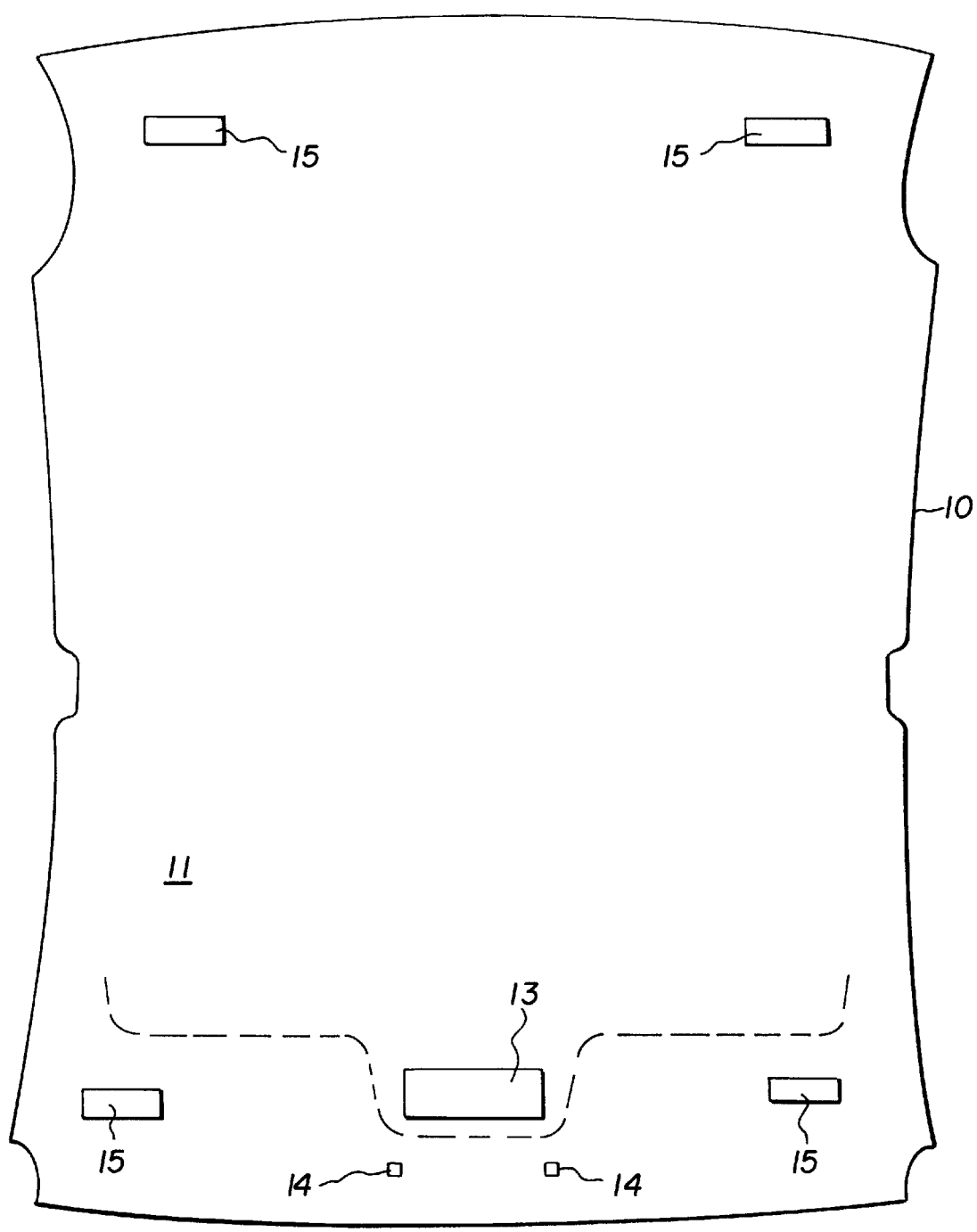
FIG. 1 is a top plan view of a headliner embodying a preferred embodiment of the present invention.

Referring initially to FIG. 1 there is shown an integrally formed and molded headliner 10 suitable for mounting to the underside of the roof of a vehicle such as an automobile (not shown) so as to present an aesthetically pleasing finished surface to the ceiling of the passenger compartment and for covering the inner roof (not shown) of the vehicle. Headliner 10 is shown from the perspective of looking down on the topside 11. That is, the side of the headliner 10 that would be adjacent to the roof of the vehicle. The underside (not shown) of the headliner may be, for example, a decorative lower surface covered by an upholstery material, such as a fabric, to provide a decorative surface exposed to the interior of the vehicle. Any decorative layer that covers the headliner should not be a barrier to sound.

The headliner is typically secured to the vehicle roof using fastener strips of the hook-loop type (such as Velcro®) and/or by interior trim strips (not shown) mounted along opposite sides of the headliner and by interior components such as visors, interior lights, grab handles, clothing hooks, etc. In addition, the headliner may be installed by adhesive bonding. Combinations of the various described attaching means may also be used.

As illustrated, the headliner includes a cut-out or opening 13 for the dome lamp, openings 14 for visor clips, and may also include various other openings, as necessary, depending upon body style. However, in some instances it may be desirable to pre-install such hardware as dome lamps, sun visors, grab handles and the like on the headliner prior to installing the headliner in the vehicle.

The headliner is a three-dimensional curvilinear shape made to conform to the vehicle roof for a given vehicle and defines the upper interior exposed surface of the vehicle.

The headliner is adapted to be mounted adjacent the underside of a vehicle roof and to extend laterally between the longitudinal side edges of the roof and longitudinally between the front and rear edges of the roof A headliner suitable for use in the present invention has to be able to literally function as a diaphragm in a speaker system. Therefore, many types of headliners that are conventionally used at the present time in the automobile industry would not be suitable for use in the present invention. For example, certain standard headliners consisting of a flimsy facing material that covers an easily compressible base material which is attached to a vehicle's roof would not be suitable in the present invention.

The headliners suitable for use in the present invention will preferably be of low cost, relatively simple to manufacture and convenient to install. In essence, the headliners are designed to function as an extended diaphragm for the loudspeaker of the present invention. The headliner will be specifically selected for radiating sound so that the internal dampening of the materials of construction and the configuration of the diaphragm itself provide internal energy absorption that suppresses resonances of the diaphragm and suppresses the formation of unwanted interference fields on the diaphragm.

The headliners of the present invention can be made by a variety of presently employed commercial processes such as by using a molded material, such as a resin impregnated compressed fibrous bat material that defines a core or substrate.

The preferred, sound radiating headliner, which in effect is an extended diaphragm, may be made of a multi-layer medium which consists of alternating layers of (1) spacing layers of closed cell plastic foam which may be rigid or semi-rigid and (2) inextensible layers of cloth, paper, plastic, metal, foil, composite etc. which are stiff so that they resist stretching. The headliner can consist of alternate layers of closed cell foam and the above described stiff layers to create a rigid to semi-rigid structure that forms the sound radiating headliner. One or more of the stiff layers of cloth, paper, plastic, metal, foil, composite etc. may be reinforced with glass and/or carbon fibers and other common reinforcing materials to make the layer even more resistant to stretching. A decorative coating or facing of fabric, flocking, printed fabric, etc. may be affixed to one or both sides of the headliner. The closed cell foam layer may be replaced by open cell foam, honeycomb, or other spacing materials that have the physical properties to act as a structural spacing layer to the rigid inextensible layers.

Both the spacing and inextensible layer s may be made from varying materials within a given diaphragm and need not all be of the same material.

Another type of headliner construction which may be utilized in the present invention, a lthough not as favorably as the construction noted above, is a relatively rigid molded construction which is retained in place through the use of trim moldings and the like. Such molded headliners h av e typically been fabricated of mo lde d fiberglass and molded hardboard and have be en of the "one-piece" or integral design.

Another type of headliner construction which may be utilized in the present invention is a one-piece bent or curved construction which is usually fabricated of a hardboard-like material. Typically, this type of headliner consists of multiple layers of kraft paper and polyethylene on the opposite sides of a Styrofoam core. Still other headliners may be formed of cardboard, other fibrous materials, etc.

Typically, the preferred headliner utilized in the present invention will have a thickness ranging from about ¾ inch to about ¾ inch, and most preferably from about 3/16 inch to about ½ inch. When formed of multiple spacing and inextensible layers, the headliner will generally contain from about 3 to about 5 of such layers.

As indicated, a variety of decorative covering media can be used so as to provide for universality of application, although where extremely low cost is desired, the headliner material per se may be textured and/or colored and thus not require a decorative covering medium.

As indicated, the headliner is preferably a multi-layer medium, consisting of alternating layers of a rigid, inextensible layer and a spacing material. In such instances the spacing material may be a closed cell foam and the rigid inextensible layer may be a cloth layer. The headliner may be a laminated structure of at least two different materials, one of said materials comprising a substrate and the other of said materials comprising a covering medium. The headliner may comprise a lamination of at least two layers, with one of said layers comprising a moisture barrier. Alternatively, the headliner may comprise a lamination of multi-layers, wherein one of said layers comprises an insulating medium. Headliners increasingly integrate vehicle subassemblies. The vehicle interior trim is an example of such integration, whereby trim panels, for example, are pre-manufactured to include a variety of accessories. Thus, for example, a vehicle headliner of the present invention may include integrated dome lights, overhead consoles and visors which have been attached to the headliner prior to the installation of the headliner assembly in the vehicle during the manufacturing of the vehicle. Various components may be added to a headliner shell prior to shipping to the vehicle manufacturer. Such an assembly can then be readily installed in a vehicle without the need for further preassembly.

Headliners may be attached to the roof or overhead structural members of vehicles by a variety of methods.

Figure 12:
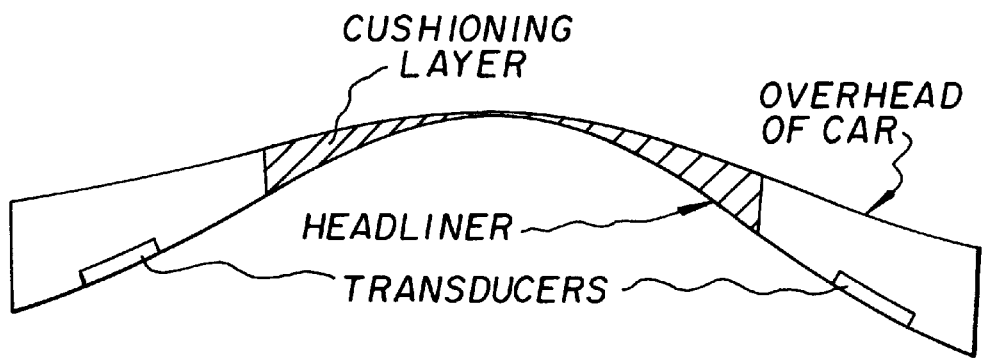

Some headliners are attached using screw or snap-in fasteners while others have employed adhesives. Hook and loop type fasteners such as Velcro® have also been employed. Manufacturers may use complex factory installed support structures employing ribbing extending from front to rear and from side to side within the shell defined by the vehicle roof to support the headliner. Alternatively, the headliner may be secured to a cushioning member that is located between all or a portion of the headliner and the overhead structural members affixed to the headliner to protect the headliner from pressing against the roof. Such an embodiment is shown in FIG. 12. As used herein, the term "cushioning member" is used to define a layer of material that is soft in compression, such as a plastic foam, that provides a cushion spacing between the roof and the headliner. The cushioning layer is not as stiff as the headliner or, of course, the transducer. With reference again to FIG. 1, transducers 15, which, in each instance are flat piezoelectric elements bonded to various substrates and motion couplers, are placed on top of a headliner 10 and serve to drive the headliner. The piezoelectric transducer may be bonded to the headliner by any suitable material. The transducer may be employed as depicted, that is, attached to the side of the headliner adjacent to the vehicle's roof, or it may be attached to the side of the headliner that is closest to the interior of the vehicle. One or more transducers may be utilized, if desired. The transducer may be secured to the headliner by a suitable adhesive. The adhesive selected must be suitable to couple the motion of the transducer to the diaphragm. Accordingly, the adhesive selected must be more rigid than the diaphragm. While, for example, epoxies, di-isocynates, acrylics and hot melt adhesives would be suitable adhesives for use in the present invention, a soft rubber cement would typically be not suitable. While adhesive bonding is a preferred method of attaching the transducer to the headliner, mechanical attachment is also possible. In this regard the transducer may be attached to the headliner by means of plastic or metal rivets, screws and screw attachments of all kinds, plastic connectors, including those of the "Christmas tree" type, and similar devices. A Velcro® fastener may also be used as long as it is of a suitable stiffness. These additional methods of attachment may be used alone or in combination with adhesive bonding. While FIG. 1 illustrates using more than one integral transducer which is constructed in accordance with the present invention, it is understood that only one transducer can be utilized. However, it has been discovered that using more than one transducer in conjunction with the same diaphragm will create a stereo sound image, and will also increase the loudness and/or extend the frequency range. The preferred distance by which the transducers should be separated will depend on the size, material of construction and configuration of the headliner. For standard sized headliners, the integral transducers may be separated by a distance of approximately 1 foot to about 4 feet.

One of the reasons a piezoelectric element is the preferred transducer material is that it is very thin and light, and thus can be advantageously placed in the headliner area of a vehicle. Typically the thickness of a piezoelectric element that can be used in the present invention will range from about 5/1000 inch to about 30/1000 inch. The piezoelectric element will typically have an area ranging from about 1 to about 4 square inches, and the weight of the piezoelectric element will range from about 0.25 ounce to about 8 ounces.

Figure 2:
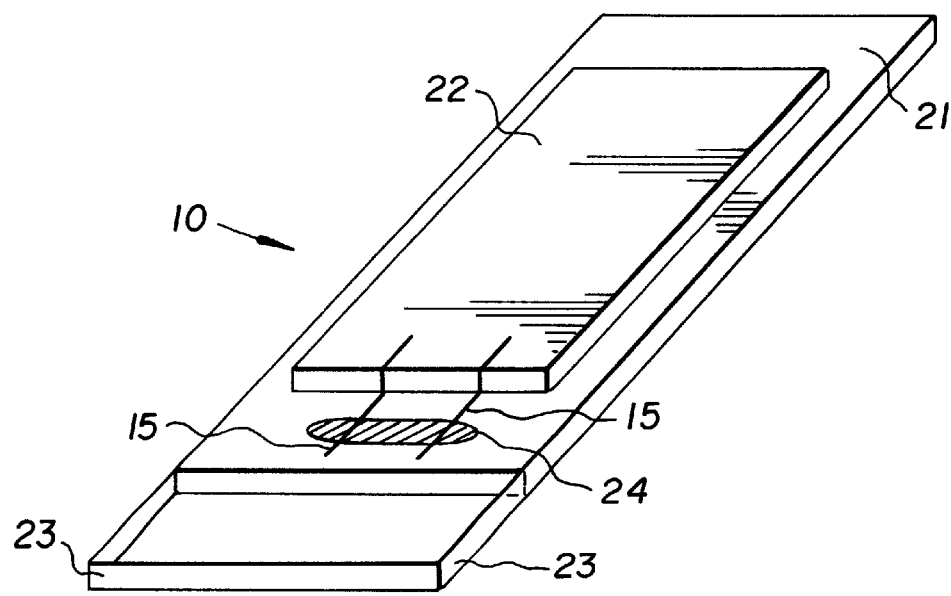
FIG. 2 illustrates one embodiment of a transducer utilized in conjunction with the headliner according to the present invention.

FIG. 2 shows the use of a substrate 21 which is positioned intermediate the piezoelectric element 22 and the headliner 23. The substrate 21 will have a larger surface area than the flat piezoelectric element 22 in order to impart motion to a larger area of the headliner than if the piezoelectric element alone was attached to the headliner. This will result in cost savings since lesser amounts of the costly piezoelectric material need be utilized. The substrate will have a rigidity approximately equal to the rigidity of the piezoelectric element and greater than the rigidity of a headliner to which the substrate will be attached.

Many materials may be advantageously used for the substrate. These materials include steel, aluminum, brass, copper, and other metals, plastics, composite materials, etc. Brass is a preferred material for the substrate because of its low cost, environmental resistance, ease of bondability and because its Young's modulus of elasticity is similar to that of certain piezoelectric materials, such as PZT (lead-zircontitanate). Plastic is another preferred material because of its low cost, environmental resistance, and the fact that it can be made in a great variety of stiffnesses or hardnesses.

There is also included means to apply electric potential to the piezoelectric element, which in FIG. 2 comprises a connector 24 for a wire harness which is optionally attached to and extends from substrate 21. FIG. 2 also illustrates electrical leads 25 from the piezoelectric element 22 to connector 24.

Substrate 21, (or transducer 15 in FIG. 1, when a substrate is not used) will be attached directly to the headliner. The substrate and/or the transducer element may be preformed, or otherwise configured, to conform to the curvature, or other shape, of the headliner to which it is attached. In a preferred embodiment, for maximum efficiency and minimum distortion, both the mechanical and electrical impedances of the transducer should be matched. That is, the mechanical impedance of the transducer should be matched to that of the headliner while the electrical impedance of the amplifier that drives the transducer should be matched to that of the transducer when it is radiating sound. In another embodiment, the piezoelectric element may consist of two or more layers arranged on top of one another and electrically connected in an alternating fashion to enhance the motion of the piezoelectric element.

The piezoelectric element, when utilized in a transducer, can have a wide variety of shapes, such as square, rectangular and round. Irregular shapes may also be used to minize resonances on the transducer itself and/or to extend the frequency range. To accomplish the latter goal, elliptical, semi-elliptical, truncated rectangular and truncated square shapes, etc., may be used.

Figure 3:
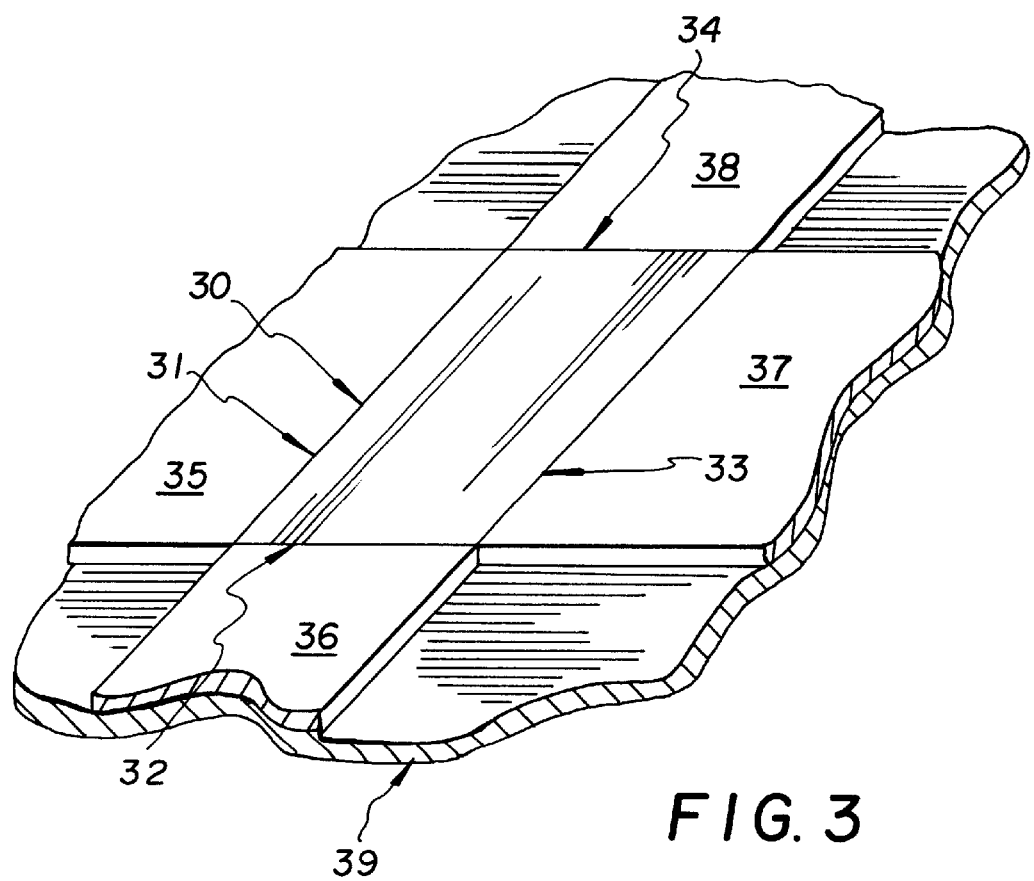
FIG. 3 illustrates another embodiment of a transducer used in the present invention in which a piezoelectric element is utilized in conjunction with a substrate and motion couplers.

FIG. 3 illustrates another embodiment of a transducer of the present invention in which piezoelectric element 30, which in the illustration has a rectangular shape (although any other shaped piezoelectric element can be utilized in this embodiment) is coupled on, most preferably, all its sides 31, 32, 33, 34 with motion couplers 35, 36, 37, 38 to futher ensure the coupling of the motion of the piezoelectric element to substrate 39 by providing a coupling transition to the substrate, to which piezoelectric element 30 is bonded and positioned on top of, in all directions of movement. If desired, the motion couplers may be attached only to certain sides of the piezoelectric element 30. By providing a coupling transition to the substrate it will be further insured that the motion of the piezoelectric element will be coupled to the headliner (not shown). This is accomplished by tightly coupling, preferably, both the transverse and lateral motions of the piezoelectric element, first to the motion couplers, with the end result that the motion will thereafter be passed through the substrate to the headliner. The motion couplers will also be attached to the substrate. It has been discovered that the use of the motion couplers will increase the loudness of the sound produced by the headliner and extend the bass sound produced to lower frequencies.

The thickness of the transducer element comprising the piezoelectric element used in concert with the substrate and motion couplers will typically range from about $5/1000$ inch to $30/1000$ inch.

Figure 4:
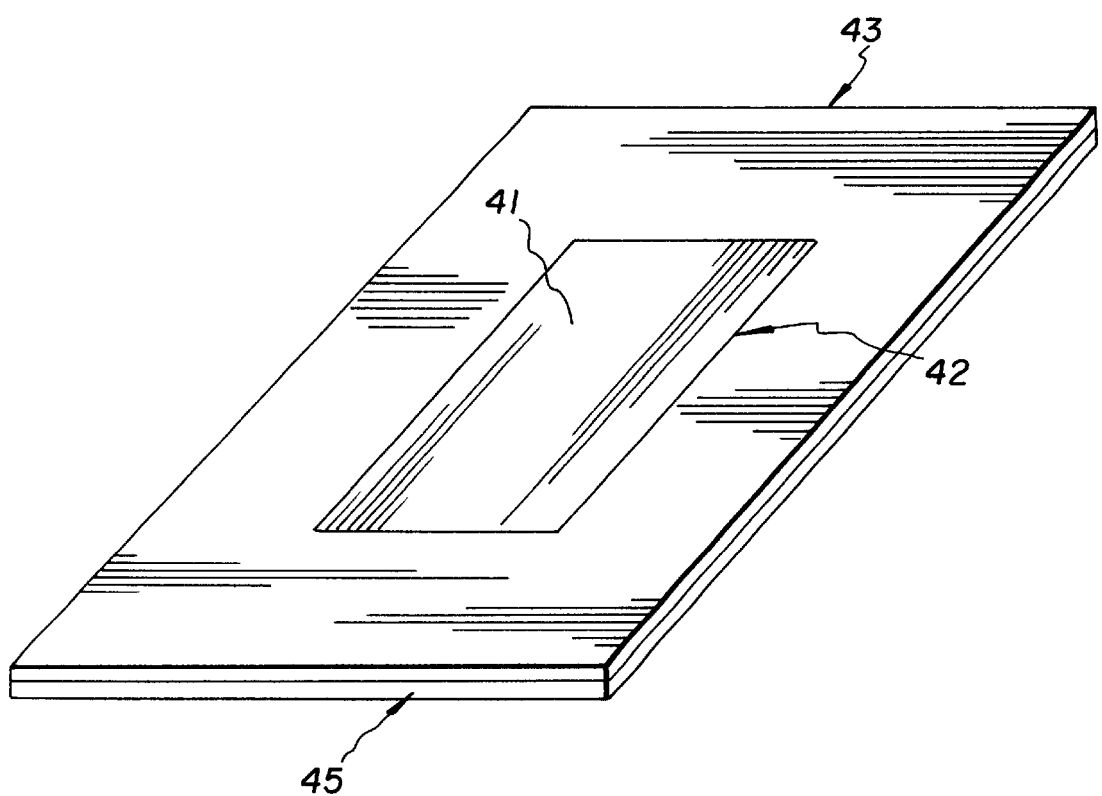
FIG. 4 illustrates another embodiment of a transducer used in the present invention in which a piezoelectric element is shown as being utilized in conjunction with a substrate and motion couplers in another manner.

In some cases, the substrate layer, shown as 21 in FIG. 2, 39 in FIG. 3, and 45 in FIG. 4, may be omitted and the piezoelectric element and motion couplers may be attached directly to the headliner. Thus, the underside of the piezoelectric element, in this case, is directly attached to the headliner, while the motion couplers extend outward from one or more sides of the piezoelectric element and are typically as thick as, and planar with, the piezoelectric element. Using the piezoelectric element with motion couplers alone is a favorable option when the headliner is sufficiently stiff due to its inherent construction and, as a result, radiates sound well when excited by the transducer.

Figure 7:
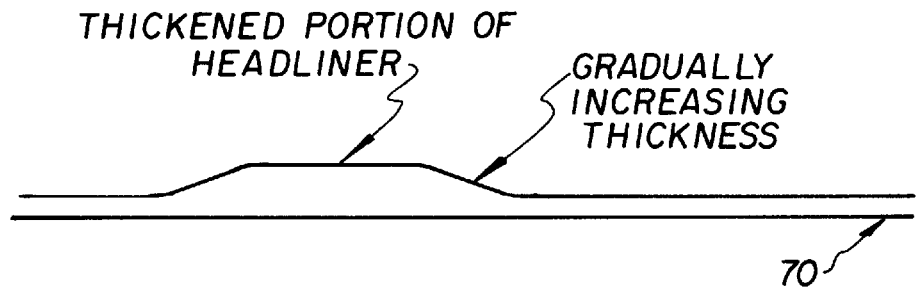
FIGS. 7 and 8 are cross-sectional views of headliners embodying other preferred embodiments of the present invention.
Figure 8:
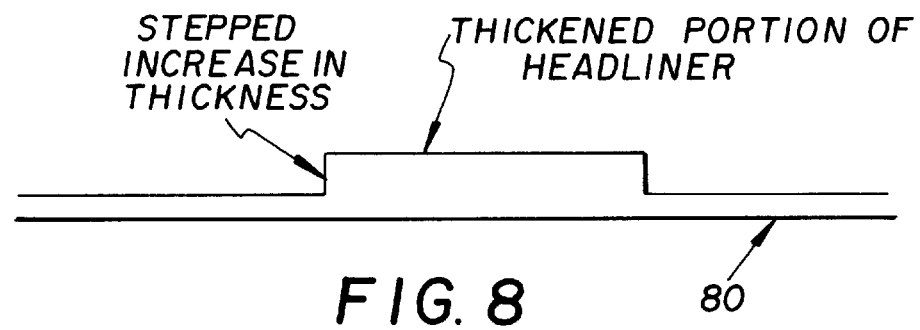

It is the function of the substrate to magnify the motion of the piezoelectric element by increasing the separation between the piezoelectric element and the headliner and by spreading the motion of the piezoelectric element over a larger area of the headliner. The same functions may also be provided by thickening the headliner beneath the piezoelectric element and the motion couplers or by thickening the headliner under the piezoelectric element only with or without the use of motion couplers. If motion couplers are not used, then the headliner must be thickened more than in the case where the motion couplers are used. The thickening of the headliner may be accomplished as shown in FIGS. 7 and 8, by either gradually increasing the thickness of the headliner 70, as shown in FIG. 7, or by creating a stepped increase in thickness of the headliner 80, as shown in FIG. 8. When the headliner is thickened, it is important to be sure that the thickened portion is sufficiently stiff to couple the motion of the piezoelectric element to the headliner. If necessary, the thickened portion of the headliner may be stiffened by increasing the number of inextensible layers within the thickened section of the headliner, or the headliner can be stiffened by various other means.

FIG. 4 illustrates a further embodiment of the present invention in which the piezoelectric element 41 is shown as being utilized in conjunction with motion couplers in another manner. In this embodiment, the outer perimeter 42 of piezoelectric element 41 is completely surrounded by a single motion coupling plate 43. Motion coupling plate 43 has a hole, which in the depicted embodiment is in its center, which is cut out in order to accommodate the presence of piezoelectric element 41, which must fit the hole in motion coupling plate 43 very snugly so that the piezoelectric element 41 will be bonded at its edges 42 to the edges of the hole in motion coupling plate 43. In general, motion coupling plate 43 should be of the same thickness as transducer 41. Transducer 41 and motion coupling plate 43 are both bonded to the underlying substrate 45. The material of the motion coupling plate 43 and the substrate 45 may be of the same material or different materials such that the motion of piezoelectric element 41 is not substantially restricted. One advantage of this concept is that less parts are involved and hence the transducer is more readily adaptable to being mass produced.

Figure 5:
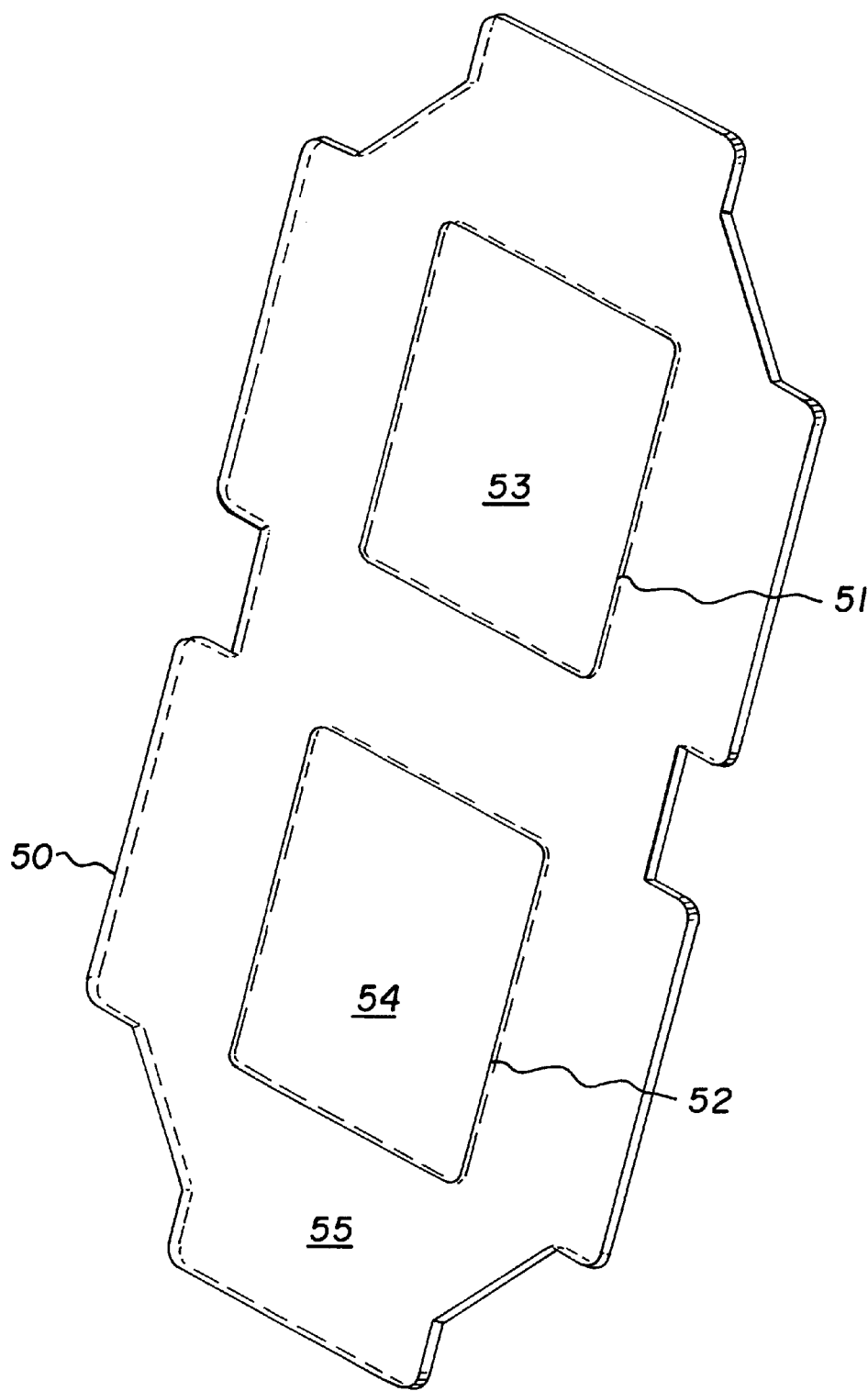
FIG. 5 illustrates a further embodiment of a transducer utilized in conjunction with a combined transducer and motion coupler which is applicable for use in the present invention in which the motion coupler and the substrate are an integral unit.

FIG. 5 illustrates a further embodiment of the present invention in which the substrate and motion coupler are formed from the same material and are shaped as an integral unit 50, which is substantially flat. As illustrated, piezoelectric elements 51 and 52, which are also substantially flat, are inset in depressions that are molded, machined, or otherwise created in unit 50, with the top sides 53 and 54 of, respectively, transducers 51 and 52, being planar with the top side 55 of unit 50. Alternatively, top sides 53 and 54 can extend above, or below, top side 55. Obviously, unit 50 can be designed to accommodate only one piezoelectric element or it can accommodate two or more piezoelectric elements.

Figure 6:
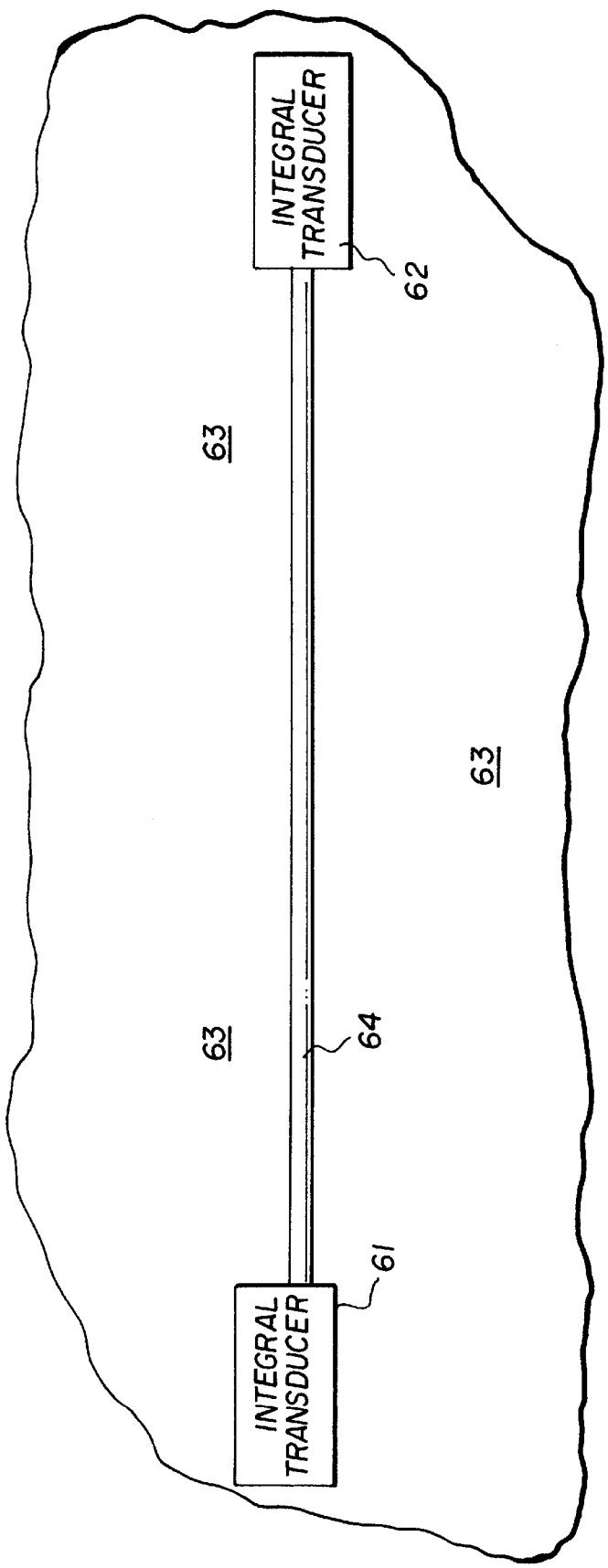
FIG. 6 illustrates another embodiment of the present invention in which two transducers are connected to each other via a mechanical connection.

It is a key feature of the present invention that the transducer, when attached to the headliner, forms a loudspeaker. FIG. 6 illustrates a further embodiment of the present invention, in which transducers 61 and 62, which are attached to headliner 63, are connected to each other via a mechanical connector 64. It has been shown that, when such a mechanical connection is employed, the quality of the stereo effect produced will be enhanced and the overall quality and volume of the sound will be improved. In one embodiment, the mechanical connection may take the form of a metal beam of 0.02 inch thick steel, 1 inch wide and a length such that some outward force is exerted on the integral transducers. Of course, other materials of construction and/or other dimensions of mechanical connector 64 may be utilized. In another embodiment, when more than one transducer is utilized in conjunction with a particular diaphragm, the mechanical connector may be an integral part of the transducers. For example, the substrate may be made continuous between the transducers to form the mechanical connection. Alternatively, the motion couplers described above may be formed into an integral mechanical connection.

The transducer utilized in the present invention should have a shape that conforms to the shape of the portion of the headliner to which it is attached. Although FIG. 1 depicts a flat transducer, it is understood that in another embodiment both the transducer and the headliner may be curved, with the transducer being located adjacent the curvature of the headliner. In those cases where the transducer is a flat piezoelectric element having a top side and an under side, it is preferred that the headliner has a substantially flat portion to which the under side of the piezoelectric element is joined. In such instances, it is most preferred that the substantially flat portion of the headliner to which the under side of the piezoelectric element is joined has a greater degree of stiffness than the other portions of the headliner. In such a case, inter-layers may be added to the diaphragm to increase the degree of stiffness in areas where the transducer is attached. In this regard, it has also been found that the placement of transducers on the curvature of the headliner and, in particular, at or as close as possible to the maximum radius of curvature will produce the maximum volume of sound and the best overall effects.

Figure 9:
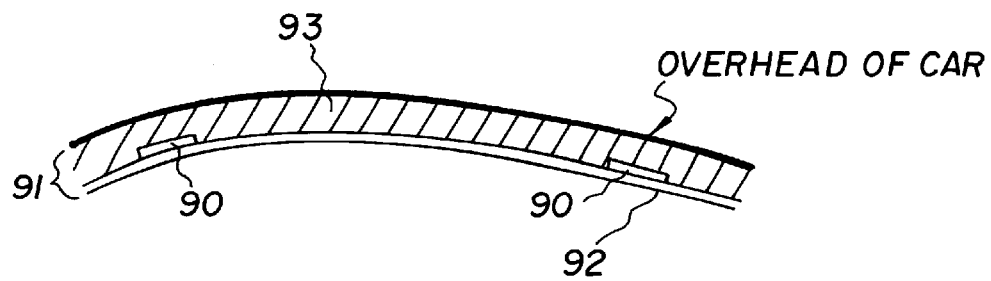
FIGS. 9–12 are cross-sectional views of headliners embodying still other referred embodiments of the present invention.

FIG. 9 depicts transducers 90 that are enclosed within the body of the headliner 91. One method of accomplishing this is where the headliner has an aperture on a portion of its surface in which the transducer is inserted or the transducer may be installed during manufacture.

As indicated, the headliner can be any of a variety of styles and methods of construction. FIG. 9 illustrates a headliner 91 which is a composite comprised of an inextensible layer 92 and a spacing layer 93, with the transducers 90 being located within the spacing layer 93. The spacing layer will be much stiffer, in terms of its ability to withstand vertical compression, than the cushioning layer referred to above but will not be as stiff as the transducer or the inextensible layer of the headliner. The spacing layer may be a corrugated core, a paper or metal honeycomb, a stiff closed cell foam, etc. As indicated above, in some cases, it is advantageous to use a cushioning layer between the headliner and the roof of the car, or other supporting structures, such as ribs, etc. to help control the motion of the headliner. That is, under excitation by the transducer, the headliner may vibrate in such a way that it rubs against the roof or at the edges, etc. This rubbing motion causes distortion of the sound and can be prevented by the use of cushioning layers which prevent rubbing but permit the headliner to vibrate freely.

Figure 10:
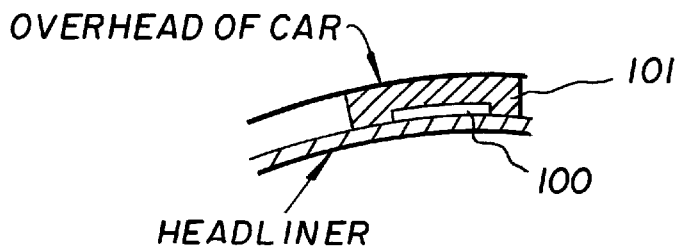
Figure 11:
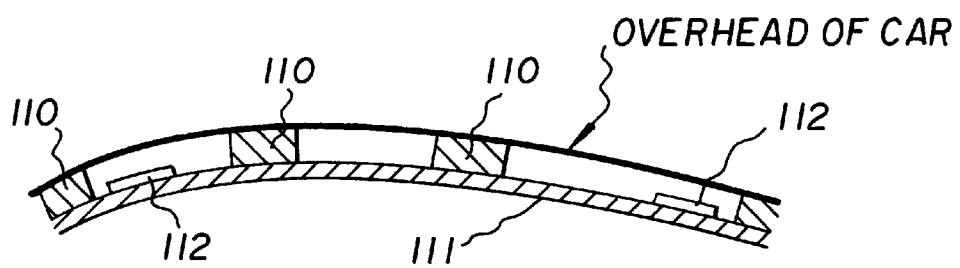

When cushioning layers are used between the headliner and the overhead to help the headliner keep its desired form they may take the form of ribs or patches of cushioning material attached to the headliner. The transducers of the present invention may be installed within the cushioning material next to the side of the cushioning layer that is attached to the headliner, as is shown in FIG. 10, wherein transducer 100 is inserted within cushioning layer,101. Alternatively, the transducer may be attached between ribs or patches of cushioning material as shown in FIG. 11. Here cushioning layers 110, in the form of ribs or patches, are attached to the headliner 111 and the overhead 112 of the car, to form a compliant spacer. The transducers 112 are attached to the headliner in the open spaces between the ribs or patches of cushioning layers 110. Alternatively, the transducer(s) may be located intermediate the spacing layer and the inextensible layer.

Figure 13:
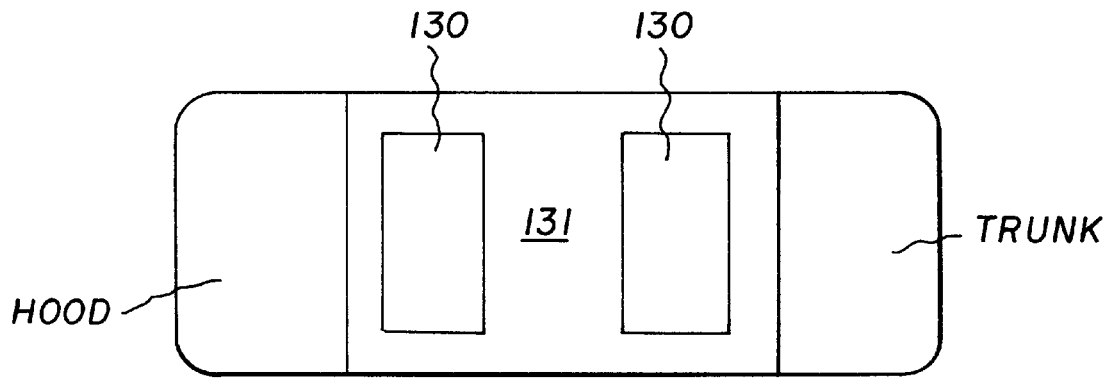
FIGS. 13 and 14 illustrate another embodiment of this invention wherein portions of a headliner material are utilized as loudspeaker components in a vehicle.
Figure 14:
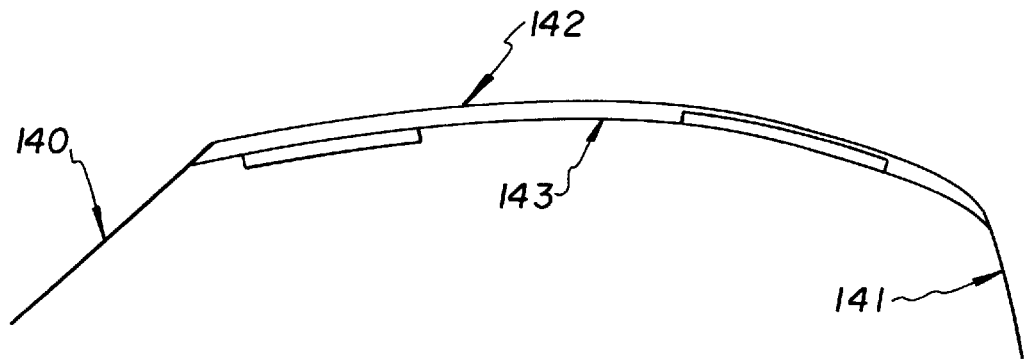

Referring to FIGS. 13–14, there is illustrated different positioning using the concepts of the present invention to satisfy the automobile after market. Specifically, in FIG. 13 there is illustrated an overhead view of an automobile's roof assembly from the inside of a passenger compartment in which two headliner subassemblies 130 of the present invention are attached on the underside 131 of the the existing headliner in an automobile. Such. a speaker system would be utilized in instances in which it would be costly or difficult to put an entirely new headliner in a used automobile. Headliner subassemblies 130 can be made from a typical piece of headliner material as described above and would typically be about ⅜ inch thick to ¾ inch thick and would typically have dimensions that vary from a length of about 14 inches to about 48 inches by a width of about 7 inches to about 18 inches. The subassemblies 130 can be affixed to an existing headliner 131 by Velcro® or other convenient attaching means. The subassemblies 130 will be integrated speaker units having a transducer or transducers attached thereto in a manner previously described along with electronic means electrically connected to the transducer to apply electric potential thereto. FIG. 14 illustrates a side view of an automobile having windshield 140, rear window 141, roof 142, headliner 143 and subassemblies 144 and 145. Alternatively, the subassemblies of the present invention can be fit into an existing headliner by cutting out a portion of the existing headliner and fitting the subassemblies into place.

Such subassemblies can be installed in the front and rear of the passenger compartment, as depicted and/or may be attached to the roof above the existing headliner or may be attached to the side of the headliner closest to the roof Where practical or feasible, the existing loudspeakers in a vehicle that is being modified with subassemblies according to the above embodiment of the invention can be used to provide bass output.

Figure 15:
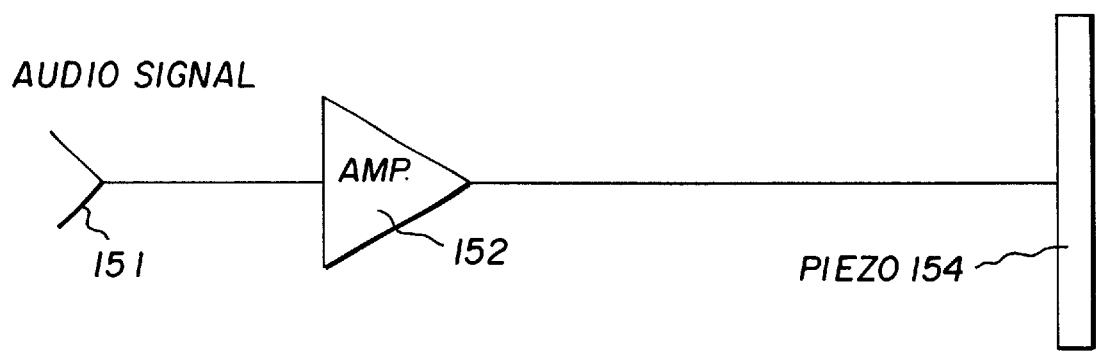
FIG. 15 is a block diagram of an audio circuit utilized in the present application.

All speaker systems require some form of amplifier. The present invention utilizes a system illustrated in the block diagram of FIG. 15. The audio signal 151 is fed into an audio amplifier 152 that provides the signal "boost" or amplification. The output of the amplifier 152 is fed into a piezoelectric element 154. In addition to the basic electronic elements shown in FIG. 15, the electronic components that drive the transducer may also consist of a typical equalization circuit to provide the desired sound amplitude contour as a function of frequency. Various other circuits to provide ambience, reverberation, active noise control, telephone, output from voice recognition circuits, etc. may be appropriately made a part of the electronic package that energizes the loudspeaker system.

It is a particular aspect of piezoelectric transducers that comparatively high voltages are required to drive the transducer in order to produce a high volume of sound within the vehicle. If the amplifiers are located away from the transducers, such as, with reference to the present invention, in the dash area of the car at the instrument panel radio, this necessitates long wire runs carrying comparatively high voltages, sometimes greater than 50V. FIG. 16 illustrates another aspect of the present invention which addresses this problem. As per FIG. 16, a high voltage, low current amplifier 161 is attached to headliner 166 or to a part of the automobile structure and is located substantially adjacent to the transducer 162, thus forming an integrated device resulting in lower voltage requirements in signal lines 163 running to the amplifier from the vehicle radio, CD player, tape player, telephone, or other audio source. Only relatively short electrical lines 164 carry high electrical voltage to piezoelectric elements 165. Electrical lines 164 may be made very short and may be insulated, shielded, and otherwise protected to eliminate any high voltage problems. Alternatively, the amplifier can be incorporated in the transducer assembly. For example, the audio output of a radio, tapedeck or CD player is about 24V maximum, and the power supply to the amplifier is 12V. Only these lower voltages would be required on wires running to the integrated amplifier/transducer package. The high voltage necessary to drive the piezoelectric transducer would be confined within the integrated package and would greatly reduce or eliminate the high voltage problem. While it is preferred at all times to cover the transducer with an insulating medium to prevent moisture, heat buildup and/or dielectric breakdown, there is a particular need for proper insulation when the amplifier is located on or near the transducer. Also, when more than one transducer is utilized in the present invention each will have its corresponding amplifier, which, according to the present embodiment, may be located at or in the vicinity of the corresponding transducer.

In some cases, it might be desirable to energize the piezoelectric transducer from a conventional low voltage, high current amplifier. In such a case, a transformer (not shown) is used to change the low voltage, high current signal to a high voltage, low current signal. When this method of energizing the piezoelectric transducer is used, the transformer can be integrated with the transducer to produce the same results as described above.

FIG. 17 illustrates another method for installing the transducers of the present invention to a vehicle headliner. The method illustrated can be used for new construction as well as aftermarket installation onto existing headliners. FIG. 17 illustrates a transducer 171 affixed to a headliner 172 by means of reinforcing cloth 173. The reinforcing cloth may be made of fiberglass, other synthetic and natural fibers, metal or plastic cloth or screen, expanded metals and plastic, plastic or metal mesh, etc. The reinforcing cloth is impregnated with a relatively rigid adhesive so that its lower surface will adhere to the headliner and its upper surface will adhere to the lower surface of the transducer. Because the reinforcing cloth will readily conform to the shape of the headliner, this method of installation is applicable to all headliner configurations. Further, since the reinforcing cloth will stiffen the headliner after the adhesive hardens, this method of installation will produce a good loudspeaker system with nearly all kinds of headliner construction, since the stiffness imparted to the headliner can be made as large as necessary by using other materials in place of the reinforcing cloth, as already described, or by using more than a single layer of reinforcing cloth. If more than a single layer of reinforcing material is used, each layer must be impregnated with a relatively rigid adhesive.

Although piezoelectric transducers are preferred, other types of transducers may be used in the invention. For example, the transducer may be a magneto-strictive transducer, an electromagnetic transducer, an electro-static transducer or a micro-motor. In such cases, it is preferred that the transducers be substantially flat. Compared to all of the above embodiments, piezoelectric transducers are preferred because they are much thinner and lighter, which is of extreme importance because of the size and weight limitations faced by current vehicle manufacturers, they run cooler (particularly in reference to an electro-magnetic transducer) and also because they are currently much more economical than all of the variations referenced above.

The forgoing is considered as illustrative only of the principles of the invention. Further, since numerous modifications and changes will readily occur to those skilled in the art, it is not desired to limit the invention to the exact construction and operation shown and described. For example, it is anticipated that the loudspeaker system of the present invention may be utilized in conjunction with the conventional speaker systems which are described above. In addition, the novel system of the present invention can be integrated with a vehicle's cellular telephone or other two-way radio system to thereby form an external loudspeaker for the telephone or radio system. In such applications, where a "hands-free" cellular system is desired at least one microphone for the cellular system can be also placed in the vicinity of the headliner, and preferably within the headliner, above where the driver would be seated in the vehicle. In this regard, an array of microphones could be utilized.

Accordingly, all suitable modifications and equivalents may be resorted to, falling within the scope of the invention.

What is claimed is:

1. A loudspeaker system comprising a piezoelectric element subject to displacement by applied electric potential and having a top side, an under side and an outer perimeter;

a substrate having an upper and lower side, with the upper side of the substrate being joined to the underside of the piezoelectric element;

a diaphragm that is driven by the excited piezoelectric element, said diaphragm being comprised of the headliner of a vehicle;

means to attach the lower side of the substrate directly to the diaphragm; and means to apply electric potential to the piezoelectric element, wherein said substrate having a larger surface area than the piezoelectric element and having substantially the same rigidity as the piezoelectric element but a greater rigidity than the diaphragm.

2. The loudspeaker system of claim 1 further comprising at least one motion coupler having an upper side and an under side and an outer edge, wherein at least a portion of said outer edge is adjacent to at least a portion of the outer perimeter of the piezoelectric element and the under side of the motion coupler is adjacent to the upper side of the substrate.

3. The loudspeaker system of claim 2 wherein the at least one motion coupler is in one piece which completely surrounds the piezoelectric element.

4. The loudspeaker system of claim 2 wherein the at least one motion coupler is comprised of the same material as the substrate.

\* \* \* \* \*